UNITED STATES PATENT OFFICE.

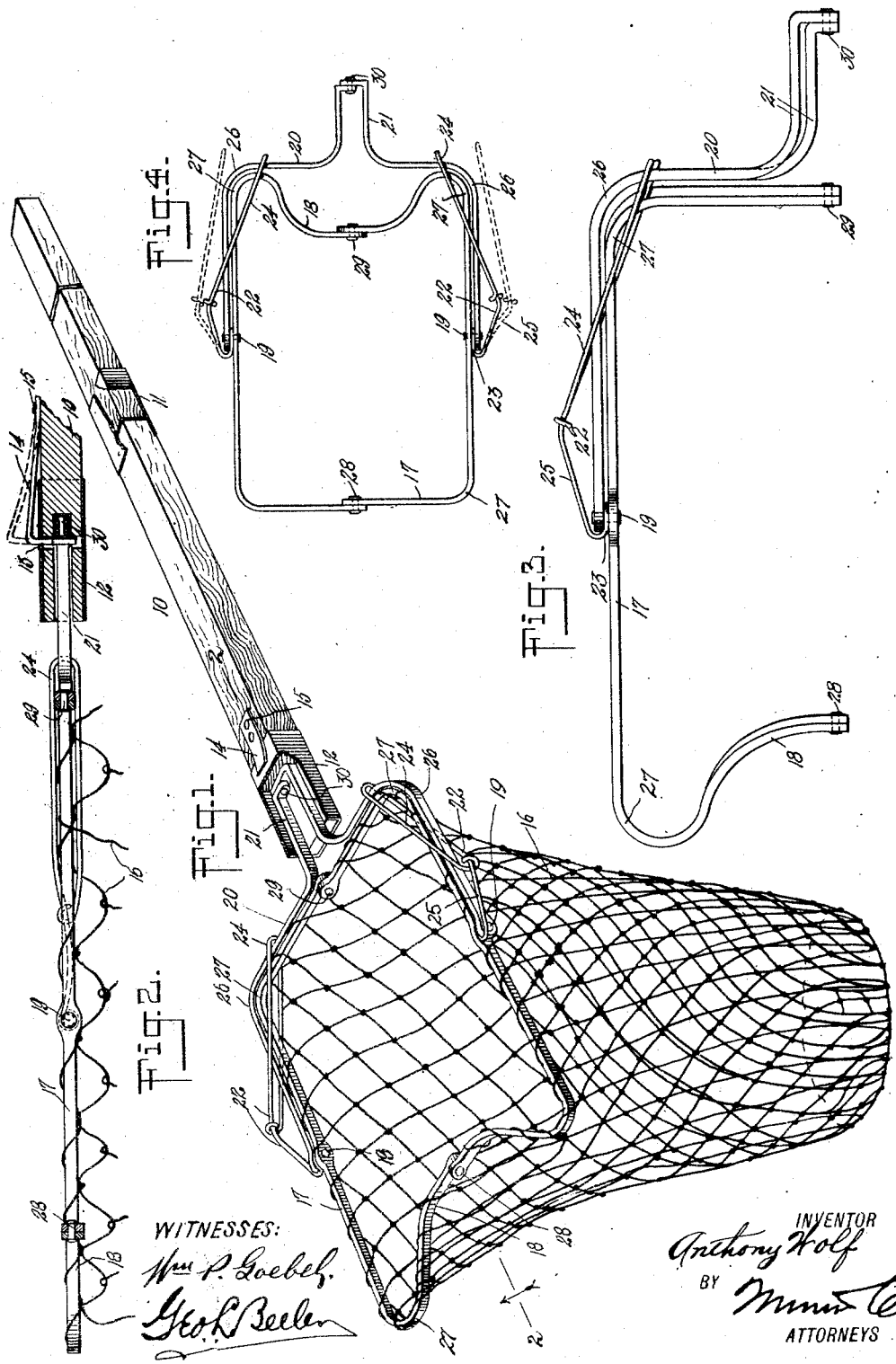

ANTHONY WOLF, OF LONG ISLAND CITY, NEW YORK.

FISHING-NET.

1,366,145.  Specification of Letters Patent.  Patented Jan. 18, 1921.

Application filed July 13, 1920. Serial No. 395,874.

*To all whom it may concern:*

Be it known that I, ANTHONY WOLF, a citizen of the United States, and a resident of Long Island City, borough of Queens, in the county of Queens and State of New York, have invented a new and Improved Fishing-Net, of which the following is a full, clear, and exact description.

This invention relates to fishing nets and has particular reference to hand operated devices and especially to nets commonly employed for crabbing or landing fish that are caught on hooks.

Among the objects of the invention is to provide a fishing net having a practically rigid frame adapted to be disconnected from the handle and folded so as to occupy a small amount of space.

Another object of the invention is to provide a fishing net having a frame and means for pivoting the frame to a handle or other analogous support, the frame being of different forms at the opposite ends and adapted to be swung end to end so as to bring the desired end into operative or forward position, depending upon the locality in which the device is to be used.

With the foregoing and other objects in view the invention consists in the arrangement and combination of parts hereinafter described and claimed, and while the invention is not restricted to the exact details of construction disclosed or suggested herein, still for the purpose of illustrating a practical embodiment thereof reference is had to the accompanying drawings, in which like reference characters designate the same parts in the several views, and in which—

Figure 1 is a perspective view showing my improvement with the frame adjusted for operating along a pile or the like.

Fig. 2 is a longitudinal section on the line 2—2 of Fig. 1.

Fig. 3 is a plan view of the metal portion of the net folded.

Fig. 4 is a plan view of the metal portion or frame work indicating the position of the frame with the square end forward as for operating along a relatively flat surface.

Referring now more particularly to the drawings I show my improvement as comprising a handle 10 made up of any suitable number of parts detachably connected each to each as by means of ferrules 11, while the lowermost section of the handle is provided with a socket including a metal ferrule or sheath 12 having an opening 13 in one side through which a spring catch 14 projects. The outer end of the catch is fixed at 15 to the outer surface of the lowermost section of the handle.

The net is indicated at 16 and is of any usual or approved construction in so far as the fabric or mesh portion is concerned. For the net I provide a frame 17 of generally rectangular form but having one end concaved as shown at 18 while the other end as well as the sides is preferably straight. The upper edge or mouth portion of the net is preferably threaded or laced upon the frame 17 permanently, and in accordance with the usual practice of such nets the bag portion of the net is adapted to be turned in and out through the frame. At the central portions of the sides of the frame are pivots 19 through which the frame is connected to a bail or fork 20 having a shank portion 21 adapted to project into the socket at the lower end of the handle. The catch 14 is adapted to snap into the interior of the shank 21 whereby the bail is locked to the handle. This manner of attaching the frame to the bail adapts the frame to be turned around the axis of the pivots so as to present either the straight end or the curved end forward, depending upon the locality in which the net is being used. For instance for operating the net upward along pile or other submerged body having a curved surface the end 18 will be adjusted forward as shown in Fig. 1, but if the net is to be used along the bottom of the water or other relatively flat surface the straight end will be presented forward as shown in Fig. 4. The adaptability of the net to turn in and out through the frame facilitates this end to end adjustment of the frame. Any suitable means may be provided to lock the frame in adjusted position and preferably in the plane of the bail. To this end I provide a pair of keepers 22 each having an eye 23 surrounding the pivot between the adjacent side bar of the frame and the pivot portion of the bail. This eye portion of the keeper serves in addition to its function as a connection for the keeper to act as a spacer between the frame and the bail whereby cutting or shearing of the net is prevented. Incidentally also said eye serves to facilitate the swinging of the frame and net around the axis of the pviots. Each keeper comprises also a loop 24 and a spring shank portion 25 between the loop and the eye. The normal form of the keeper is such that the shank 25 tends to hold the loop engaged over the shoulder or corner portions 26 and 27 of the bail and frame respectively. It will be noted that the keepers 22 occupy very little room and the arrangement is such that contact between the same and any obstruction or obstacle in practice will not tend to release the loops from their normal holding position. In order to swing the frame, however, with respect to the bail the operator simply grasps the bail with both hands and with his thumbs will spread the keepers outward as shown in dotted lines in Fig. 4 setting free the frame and net to swing around the pivots, and when so swung through 180 degrees the keepers on being released will snap back to normal holding position again.

For the convenience of storage or carrying the net in the smallest possible compass I provide longitudinal pivots 28, 29 and 30 all in axial alinement. The pivots 28 and 29 connect the two lateral halves of the frame and the pivot 30 connects the two lateral halves of the bail. Since these pivots are all in alinement it is obvious that with the net disconnected from the handle by releasing the catch 14, the frame work and net may be folded directly around the longitudinal axis of the pivots as shown at Fig. 3, and with the handle made in relatively short sections detachably connected as indicated the whole device may be packed in a very small bundle.

While for some purposes the frame is preferred to be locked by the keepers in the plane of the bail, making the frame essentially rigid with the bail, it is obvious that upon the release of the keepers from the shoulder portions 27 of the frame the net may swing or suspend freely below the handle and bail, if for example the net is to be used as a dip net or its equivalent, the frame at this time being free to pivot on the pivots 19.

I claim:

1. In a fishing net, the combination of a frame having ends of different forms, supporting means for the frame including transverse pivots intermediate of the ends adapting the frame to be swung end to end, and means to prevent the swinging of the frame.

2. In a fishing net, the combination of a frame, one end of which is concaved, a rigid support for the frame, a pair of coaxial pivots connecting the side portions of the frame to said support, and keeper means coöperating with the support and frame to normally hold the frame from movement around its pivots.

3. In a fishing net, the combination of a rigid support, a frame movably connected to the support, one end of the frame being of different form from the other, and means coöperating between the frame and the support to lock the frame in operative position so as to present the desired end of the frame for use.

4. In a fishing net, the combination with a handle, a bail connected to the handle, a net, a frame to which the mouth of the net is attached and through which the net is adapted to move freely, and means to pivot the middle portions of the sides of the frame to the bail whereby the frame is adapted to occupy any desired position with respect to the bail, and means for locking the frame against pivotal movement.

5. In a fishing net, the combination with a net, frame and a bail in which the frame is pivoted to swing, of keeper means arranged to embrace adjacent portions of the frame and bail to hold them in substantially the same plane.

6. A device as set forth in claim 5 in which the keeper means comprises a keeper on each side of the net and each having a loop surrounding the adjacent corners of the frame and bail.

7. A device as set forth in claim 5 in which the keeper means includes a pair of keepers on opposite sides of the net each having a loop, a spring shank and means to connect the keeper to the pivot portion of the frame and bail, the tendency of the spring shank being to hold the loop pressed inward toward the opposite keeper and in position to embrace adjacent portions of the frame and bail.

8. In a fishing net, a frame, a support including a pair of arms straddling the frame, said frame pivoted at its central portion to turn within the arms of the support, spring held bails adapted to lock the frame against turning movement within the support, said frame and support each comprising a pair of hinged sections adapted to be folded against each other and locked against opening by said bails.

9. As a new article of manufacture, a fishing net comprising a net supporting frame having ends of different forms, a handle located in the normal plane of the frame and means for locking the frame in position with either end locked adjacent the handle.

10. In a fishing net, the combination of a frame, a bail, means to connect the frame to the bail, and a series of longitudinally arranged coaxial pivots connecting the frame and bail to fold one half of the structure over upon the other half.

11. In a fishing net, the combination of a frame, a bail, means to connect the frame to the bail, said bail being jointed so as to fold one half over the other, the bail including a shank, a handle having a socket into which the shank of the bail is projectable, and a catch coöperating with the jointed part of the shank to lock the same in the socket.

ANTHONY WOLF.